Jan. 23, 1951

S. J. BEGUN 2,538,893

APPARATUS FOR DEMAGNETIZING A MAGNETIC RECORDING-REPRODUCING HEAD

Filed March 25, 1947

3 Sheets-Sheet 1

INVENTOR
S. J. BEGUN
BY M B Pinelles
ATTORNEY

Jan. 23, 1951 S. J. BEGUN 2,538,893

APPARATUS FOR DEMAGNETIZING A MAGNETIC RECORDING-REPRODUCING HEAD

Filed March 25, 1947 3 Sheets-Sheet 2

INVENTOR
S. J. BEGUN
BY [signature]
ATTORNEY

Jan. 23, 1951 S. J. BEGUN 2,538,893

APPARATUS FOR DEMAGNETIZING A MAGNETIC RECORDING-REPRODUCING HEAD

Filed March 25, 1947 3 Sheets-Sheet 3

INVENTOR
S.J. BEGUN
BY [signature] Pineles
ATTORNEY

Patented Jan. 23, 1951 2,538,893

UNITED STATES PATENT OFFICE 2,538,893

APPARATUS FOR DEMAGNETIZING A MAGNETIC RECORDING-REPRODUCING HEAD

Semi Joseph Begun, Cleveland Heights, Ohio, assignor to The Brush Development Company, Cleveland, Ohio, a corporation of Ohio Application March 25, 1947, Serial No. 737,163

13 Claims. (Cl. 179—100.2)

Figure 1:
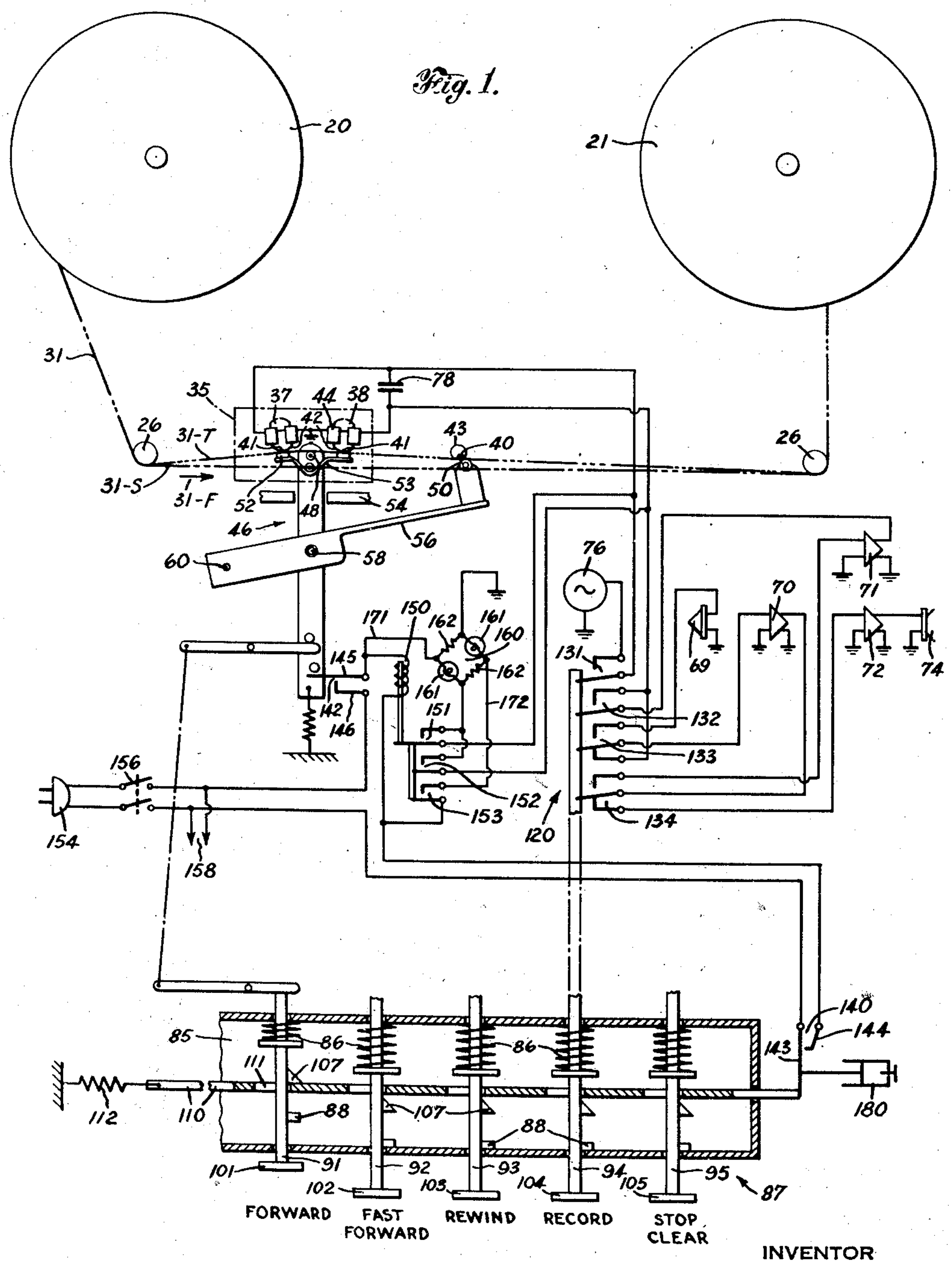

This invention relates to magnetic recording and reproducing and is especially directed to improvements for avoiding unsatisfactory performance in what may otherwise be a high quality transducing apparatus.

Such apparatus contain magnetic record transducing heads having one or more magnetic cores usually consisting of highly permeable metal provided with a non-magnetic gap along which successive elemental portions of an elongated permanently magnetizable record track are moved into magnetic linkage with the core. The cores are also usually provided with windings carrying electric currents corresponding to the magnetic flux variations in the core. Magnetic erasing, recording or reproducing may be effected with such heads, and to diminish eddy current losses their cores are generally made of one or more thicknesses of thin magnetic sheet-metal lamination.

It has been found that under certain conditions of operation, the noise level of a playback increases to such an extent as to be extremely objectionable, in spite of previously satisfactory performance. This was previously considered as caused by the retention of permanent magnetism by the cores due to the remanence of some of the signal flux. The remanence has been ascribed to the difficulty of completely magnetically neutralizing some of the core materials which in the case of recording cores, for example, could be an alloy, such as silicon steel, having a very high magnetic saturation. Other magnetic core materials, such as those useful for magnetic reproduction, could be selected from the high initial permeability alloys, such as the commercially available alloy of iron containing 76% nickel, 6% copper and 1.5% chromium and although these materials may be made to exhibit substantially zero remanence, they are known to be highly susceptible to mechanical strain which renders them permanently magnetizable.

It has now been discovered, however, that the noise level may rise to objectionable heights as a result of minor disturbances that are sometimes ignored. For example, a completely demagnetized core may begin to introduce noise after exposure to minor electric or magnetic fields of force leaking from around electric motors, relays or wiring. For example, the mere performance of one or more reeling operations, such as a rewinding, will sometimes objectionably increase the noise level even though the cores are completely demagnetized before the reeling.

This is apparently due to the fact that in spite of the greatest care in preparation, a magnetic core when mounted in a transducer almost invariably develops permanently magnetizable characteristics.

Even expedients that tend to decrease mechanical straining of the core have not been too successful in avoiding the difficulty. For example, using more and thinner core laminations so as to cause mechanical stresses to be more readily absorbed by slippage between laminations rather than the yielding of a lamination, improves the situation but is not a complete prevention. The very act of fastening the core in place may strain the core sufficiently for developing the undesired characteristics.

The complete shielding of the cores is extremely troublesome if not impossible and may not eliminate the difficulties inasmuch as the core windings are connected to an assembly of switches which have contacts that cannot easily be shielded or suitably spaced.

Among the objects of this invention is novel magnetic transducing apparatus including means for demagnetizing the magnetic cores whenever desired.

Another object of the invention is novel transducing apparatus containing means for automatically demagnetizing the magnetic cores whenever the apparatus is set for a predetermined operating condition without adversely affecting the magnetic condition of the record track.

Figure 2:
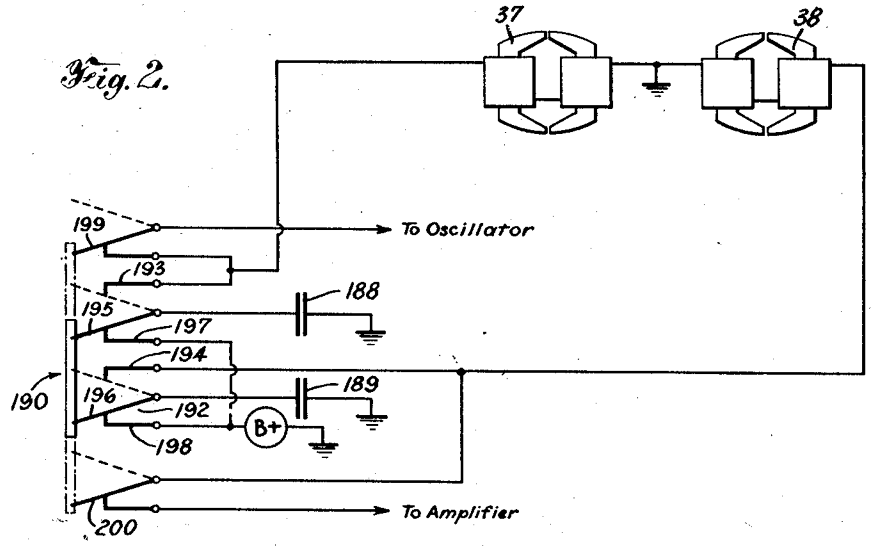
Figure 3:
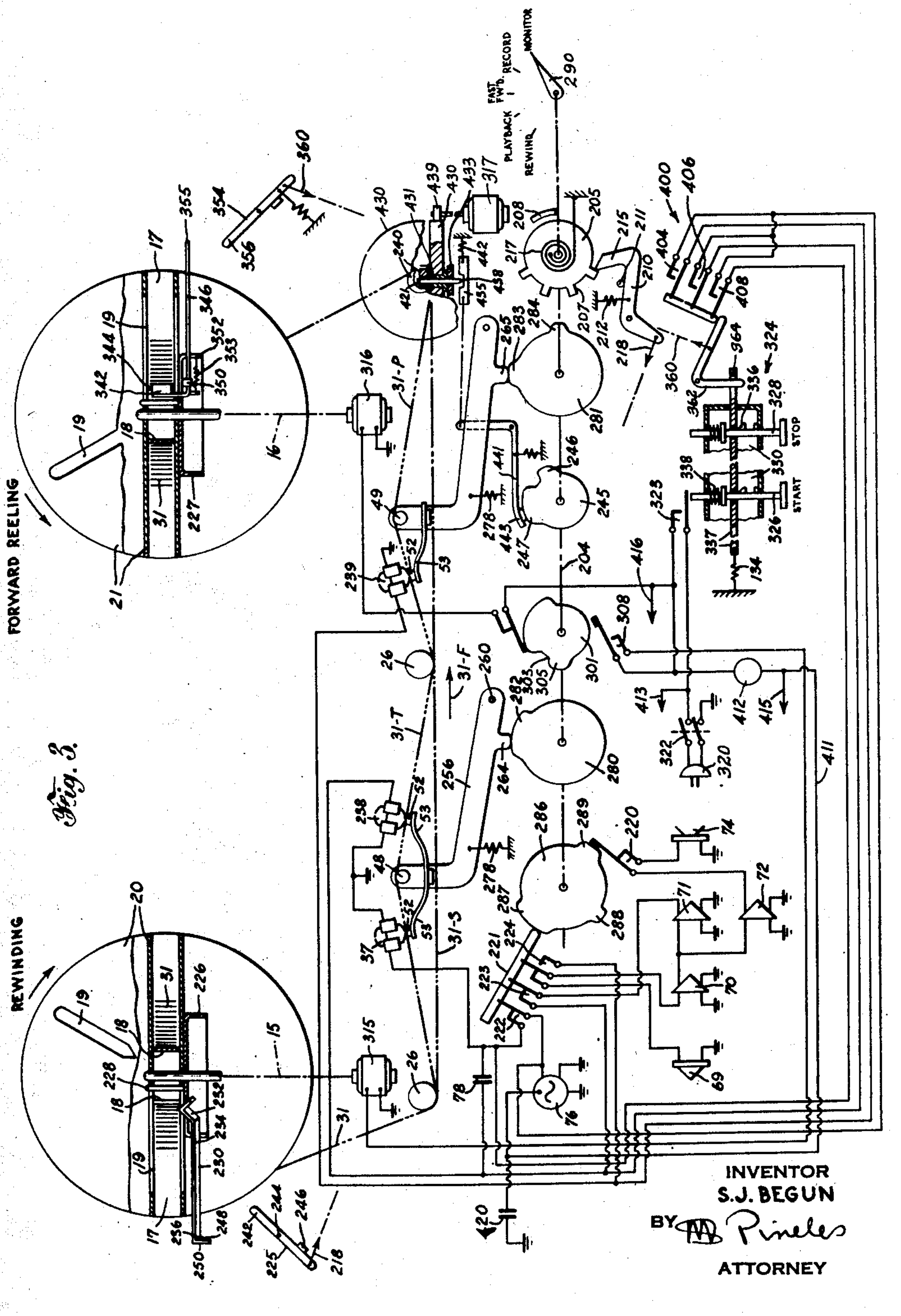

The foregoing and other objects of the invention will be best understood from the following description of exemplifications thereof, reference being had to the accompanying drawings wherein:

Fig. 1 is a diagrammatic representation of a novel magnetic transducing apparatus embodying the invention;

Fig. 2 indicates a modified construction of a portion of the apparatus of Fig. 1; and Fig. 3 illustrates diagrammatically another transducing apparatus according to a modified form of the invention.

In Fig. 1 there is shown the essential elements of a magnetic transducer in which an elongated magnetic record track 31 may be reeled in forward direction, as indicated by the arrow 31—F, from a supply reel 20 to a take-up reel 21 along a guide path between two guide rollers 26. Along the guide path between the guide rollers 26 there is positioned a transducing head 35 containing two magnetic cores 37, 38 and a capstan roller 40. Each magnetic core includes an almost completely closed magnetic circuit extending substantially entirely on one side of the guide path and having the circuit leg facing the guide path shaped to provide a smooth record track guiding surface 42 as well as a non-magnetic gap 41 by which the cores are magnetically linked with successive elemental portions of the moving record track. Windings 44 are interlinked with the cores so as to carry electrical currents corresponding to the magnetic flux in the cores.

The guide faces 42 of the cores are shown as displaced to one side of the straight line path represented by the dash-double-dot line 31—S so that when undeflected the record track will move along the path 31—S and be so far removed from the magnetic cores as to be beyond their zone of magnetic linkage.

Opposite the transducing head 35 and capstan roller 40 is positioned a deflecting structure generally indicated as 46, and equipped with deflecting guides 48 and 50 and pressing pads 52. The deflecting guides and pads are movable in a direction generally transverse to the guide path as by mounting the guide 48 and the pads 52 on a slide held between slide guides 54 and linked as by the cross-arm 56 with the deflecting guide 50.

The guides 48 and 50 may be in the form of rollers rotatably held on their arms and the pressing pads 52 may be resiliently mounted on slide 46 so as to be urged toward the magnetic cores as by biasing the pad holders 53. The guide 50 may be arranged for operation with the slide as by the pivotal mounting 58 and the anchor pin 60. The guide 50 may also be resiliently urged as by including in the arm 56 a thin springy section as shown.

The guides, particularly guide 50 which is used to press the record track against the capstan roller 40, may also be mounted so as to be automatically adjustably tilted to insure the substantially uniform pressing of the entire height of the guide 50, for example, against the capstan roller. Without this self-adjusting feature the record track may have a tendency to ride up or down along the guides and may render the reeling unreliable. The self-adjusting characteristic may be supplied by holding the deflecting guide supports to the arms by yieldable spring-like members which permit one or both ends of the supports to tilt transversely to the guide path. The pivot 58 may also be tiltably self-adjusting.

The deflecting structure 46 operates to bring the record track from the straight line path 31—S to the transducing path 31—T along which it contacts the core faces 42 and the capstan roller 40. The contact is sufficient to produce constant speed feeding of the record track by the capstan roller which is rotating at a uniform rate and is provided with a flywheel, not shown, to develop a large rotational inertia. As illustrated, the capstan roller 40 may be in the form of a thin shaft and a bearing member 43 is provided as a backing to help support it.

The capstan construction, however, forms no part of the present invention and any record track impelling arrangement may be used. The specific details of a suitable construction are shown in the Williams application, Serial No. 732,970 filed March 7, 1947.

The pads 52 serve to press the record track into stable magnetic linkage with the magnetic cores as disclosed and claimed in the Dank application, Serial No. 690,878, filed August 16, 1946, now Patent No. 2,535,486, granted December 26, 1950, in which suitable details of these features are given.

The construction of Fig. 1 also provides for rewinding a record track and for reeling it forward without transducing. All the operations are shown as effected by a control assembly 87 including a set of push rods 91, 92, 93, 94, 95 operated by buttons 101, 102, 103, 104 and 105, respectively. The rods are shown as interlinked in the conventional form of push button assembly in which inward actuation of a button from an outer retracted position in which the buttons 102, 103, 104 and 105 are illustrated to an inward position in which the button 101 is illustrated, causes the inwardly moved button to become latched in place and at the same time brings about outward retraction of any other button or buttons that may have been inwardly latched.

As shown the button operation is provided by slidably mounting the push rods in a frame 85, outwardly biasing the rods as by springs 86, stops 88 limiting the outward travel. Each of the rods includes a cam projection 107 which cooperates with a latch bar 110 perforated as at 111 to allow passage of the push rods and laterally slidable and biased in the frame as by spring 112.

Inward actuation of any of the buttons from their outward position causes the cam projection of the rod holding the button to slide the latch plate to the right, premitting the rod to move to the inward position shown for button 101, after which the latch plate is returned to the left by its bias to engage the outer face of the cam 107 and hold the button in. At the same time the sliding of the latch plate to the right removes any obstruction from behind inwardly positioned cam projections so that the outward bias 86 of any push rod previously held in inward position.

The construction illustrated permits the simultaneous inward positioning of more than one button as for example when recordings are to be made. For this operation the two push buttons labelled Forward and Record may be simultaneously held in their inward positions until the latch plate 110 slides in behind their cams.

The control assembly also includes means, not shown, for effecting the various reeling operations as indicated by the legends on the push buttons. The Forward button 101 controls constant speed reeling such as is required for transducing; the Fast forward button 102 may be used for forward reeling without transducing, as where it is desired to reach a specific portion of the recording, and such reeling need not be made at a constant speed and may be done at high speed to save time.

The Rewind push button 103 controls the reversed reeling of the record track from the take-up reel 21 back to the supply reel 20, which may also be at high speed and the Record push button 104 establishes the nature of a transducing operation. When the Record push button is in its outward restricted position the magnetic head is connected for playing back recordings and when this button is in its inward operated position, the magnetic cores are connected for making recordings on the record track.

The Stop-clear button 105 is used to stop any reeling and to clarify the playback in accordance with the invention, as indicated below.

The push rods may be arranged for coacting with electrical or mechanical switching or drive control arrangements, not shown, for applying record track impelling forces to the supply reel, take-up reel or capstan roller or to any desired combination of reel and roller as shown, for example, in the above mentioned Dank application.

One form of transducing circuit suitable for use with the invention is illustrated in the figure and includes a switch group 120 for connecting the windings 44 of the cores with the various elements of amplifying and signal transducing units. With the Record push button retracted, the switch group 120 by one of its switches 133 connects the windings of the recording-reproducing core 38 to the input of preliminary amplifier 70, the output of which through switch 134 is fed through auxiliary playback amplifier 72 to a signal reproducer such as loudspeaker 74. When inwardly actuated the Record push rod through a suitable linkage operates the switch group 120 so that switch 133 connects the input of the preliminary amplifier 70 to a source of signals such as the microphone 69 and switch 134 feeds the amplified output to an auxiliary recording amplifier 71. The output of amplifier 71 is fed through switch 132 to the windings of the recording-reproducing head 38. As illustrated, the apparatus employs A. C. biasing for diminishing distortion during recording, the high frequency oscillator 76 feeding a small biasing current through switch 131 and the condenser 78 in a manner well known in the art. The A. C. current limiting of the condenser permits most of the oscillator output to pass through the windings of the core 37 to furnish a high frequency magnetic erasing field at its gap 41.

By suitable mechanical linkage such as that shown the Forward push rod is arranged to move the deflector assembly into the operated position shown wherein it brings the record track 31 into the transducing path 31—T, into stable magnetic linkage with the cores 37, 38 and into suitable frictional driving engagement with the capstan roller 40.

The details of the amplifying, transducing, record track and reeling units as well as the magnetic cores are not a part of the present invention and any suitable prior art constructions may be used. The magnetic cores may be of the type disclosed in the Begun application, Serial No. 688,738, filed August 6, 1946, which issued as Patent No. 2,513,617 on July 4, 1950 or in the Kornei application, Serial No. 688,034 filed Aug. 2, 1946. Three cores may be used so that recording and playback are effected on different cores, as indicated for example in the Begun application, Serial No. 713,963, filed Dec. 4, 1946. Three separate motors may be used to drive the two reels and the capstan, a suitable construction and control arrangement being disclosed in the above-mentioned Dank application. If desired only two motors may be used as disclosed for example in the Williams application, Serial No. 732,970 filed March 7, 1947. Suitable automatic limit switching arrangements as disclosed in either of the last two mentioned applications or in the Begun application, Serial No. 723,735 filed January 23, 1947, are highly useful additions.

As described above each time the control assembly 87 is set for a different reeling operation the latch plate 110 is momentarily actuated to the right hand position.

According to one phase of the invention the apparatus may be arranged for effecting a demagnetization of the magnetic cores each time the controls are set for a different reeling operation. By this feature it is possible to make sure the cores are effectively demagnetized immediately before any transducing operation is commenced. Furthermore if during a transducing operation such as a playback, it is found that a background noise is interfering with the signal, the transducing may be interrupted to demagnetize the cores and clarify the signal.

As illustrated in Fig. 1 one suitable arrangement includes a switch 140 positioned for actuation by right hand movement of the latch plate 110. The switch 140 is shown connected in series with another switch 142 to establish a relay actuating circuit for effecting the demagnetization. The switch 142 may be arranged as shown for actuation whenever the deflecting assembly 46 is positioned for permitting the record track to move in the guide path 31—S, spaced and magnetically isolated from the magnetic cores 37, 38.

A demagnetizing relay 150 is shown as connected for operation by an external power supply which may be of the conventional 60 cycle A. C. type through plug 154, On-Off switch 156 and the switches 140 and 142 in series. The same power source may be used to actuate the amplifiers, oscillator and record track impelling means as by means of the leads 158.

The relay 150 operates a set of switches 151, 152 and 153 which establish the demagnetizing circuit proper. As shown the A. C. power supply is connected to opposite terminals of a bridge network 160 by conductors 171, 172, and switch 153 while the other terminals of the bridge are connected to the windings of cores 37, 38 by the switches 151, 152 and the ground connections shown.

The bridge 160 includes four arms, two opposing arms containing resistors 161 of the type having the characteristic of increasing their resistance with an increase in the current passed through them, such as incandescent lamps or varistors. The other arms contain ordinary resistors 162 arranged to balance the bridge at the highest resistance values of the current sensitive resistors 161 during the demagnetizing.

In the arrangement shown in Fig. 1, operation of any of the push buttons from an outer to an inner position causes the latch plate 110 to momentarily close the switch 140 and if the switch 142 is in the closed position at the same time the relay 150 is actuated to close the demagnetizing circuit.

One of the push buttons, as for example the Stop button may be labeled Clear to indicate that transducing clarification by demagnetization may be effected at any time by merely operating this button, even during a transducing operation. Since transducing is accompanied by opening of the switch 142 provision may be made to insure sufficient overlapping in the action of the two controlling switches 140 and 142 when the Stop-clear button is pressed during transducing, as by suitably adjusting the free path of the deflecting slide and the latch plate before engaging the movable blades 143 and 145 and bringing them in contact with the opposing contacts 144 and 146 respectively of these switches. Additionally a time delay means may be used to keep the switch 140 closed for a short time after Forward push rod 91 is unlatched. As shown the contact 144 of switch 140 may be biased toward the left and arranged to have appreciable travel to the right under the urging of the movable blade 143 so that retraction of the blade 143 by withdrawal of the latch plate 110 causes the contact 144 to follow and stay in contact with the blade for an appreciable time interval. Additionally the blade 143 may be provided with a dash-pot 180 to slow down its return to the left, if desired. Only about 3 cycles of decaying current attenuations are required for demagnetizing so that for 60-cycle currents about 1/20 of a second is the minimum switch overlap required. However more cycles may be used if desired to provide more gradual decay and to allow for the time necessary for the variable resistors to respond to the current and to balance the bridge.

Many modifications of the invention may be made without changing its basic character. For example, instead of using the conventional A. C. power line for erasing, alternating current supplied from any other source such as the oscillator 76 may be used. Also, the demagnetizing surge may be arranged to pass in series through the windings of the different cores rather than in parallel. Other modifications include the provision for the closing of the demagnetizing circuit to simultaneously alter the frequency of the oscillator so that the altered output bypasses in sufficient amount through the condenser 78 to demagnetize both cores, thus simplifying the connections to the core windings. Furthermore instead of the push button assembly shown the controls may include a rotary control rotatable to different positions for controlling the various reeling and transducing operations. The switch 140 may, with this type of construction, be positioned for operation by a cam member rotatable with the control and having switch engaging cam surfaces for closing this switch as the control is rotated between control positions, as shown in the Begun application, Serial No. 644,600, filed January 31, 1946, which issued as Patent No. 2,419,476 on April 22, 1947.

When using a portion of the apparatus as a source of demagnetizing current, suitable decay should be provided. For example when an oscillator 76 of the vacuum tube type is used, output decay may be arranged by connections which open the B+ power supply to the oscillator as the demagnetizing circuit is established. Enough capacitance may be provided on the oscillator side of the power connection so that the B+ current in the oscillator does not suddenly stop but tapers off slowly by discharge of the condenser over a time sufficient to permit the generation of the desired number of decaying cycles. Any other oscillation decaying means may be substituted.

Another simple and highly effective arrangement for demagnetizing the cores is by discharging a condenser through the windings to produce damped discharge oscillations.

Fig. 2 illustrates one form of core arrangement for demagnetizing by condenser discharge. The core windings are here shown as connected to the contacts 193, 194 of two double throw switches 191, 192 of a switch assembly 190. The movable blades 195, 196 of the switches 191, 192 are respectively connected to one electrode of condensers 188 and 189, the other condenser electrodes being connected to the core windings by means of the ground connections shown.

A suitable source of electrical energy for charging the condensers 188 and 189 such as the D. C. power source indicated by the circled B+ usually provided with any amplifier, one output terminal of which is grounded, the other being connected to the contacts 197 and 198 of the switches so that in the position of the switches shown in full lines the condensers are charged, the tranducing functions of the cores are established by the connections between contacts 193, 194 respectively and the oscillator and amplifier. These transducing connections are shown via switch blades 199 and 200 respectively, which may be mounted for actuation together with and may be part of the switch assembly 190. Other transducing switches may also be provided to vary the transducing connections as shown for example by switch group 120 in Fig. 1.

Upon movement of the switches 191, 192, 199 and 200 from their full line positions to the dashed line positions, the charged condensers 188 and 189 are disconnected from the charging source and connected across the windings of the respective cores. Damped oscillatory discharge is accordingly produced in each core winding circuit, the frequency of the oscillations being that at which the inductance and capacitance of the circuit cause it to resonate. By selecting these frequency determining characteristics, as for example the capacitances so that the frequency of the oscillations approximates that at which each circuit exhibits its highest Q, the number of decaying discharge oscillations can be increased to a maximum. Similarly by arranging for switches 199 and 200 to disconnect the core windings from the transducing circuits at the time of the discharges, any loading of the circuits such as may be effected by a relatively low impedance oscillator or amplifier output to diminish the circuit Q will be avoided.

In the arrangement shown in Fig. 2 with cores that exhibit their highest Q at about 1000 cycles and with 0.1 microfarad condensers about 6 or 7 decaying cycles of oscillations may be obtained with condenser charging voltages as low as 22½.

The discharge arrangement may be modified by using only one condenser and suitable switching to discharge through all the core windings in series. All the windings may then be designed to exhibit a high Q at the frequency of discharge.

If desired, the switches 199 and 200 may be eliminated so that the core windings are directly connected to the transducing controls as in the construction of Fig. 1. As so modified the discharges may have a less perfect demagnetizing action when brought about while the windings are connected to the output of the oscillator or amplifier. However, there will still be many highly effective discharges produced while the record push button is retracted and only the windings of one core (core 38) are connected to an amplifier input, which input has a relatively high impedance and does not significantly load the circuit. Furthermore, the inward actuation of the Stop-clear button to demagnetize the heads will cause retraction of the other buttons so that the demagnetizing discharges, when badly needed, are not excessively damped by any loads.

By way of further modification the invention may be embodied in an apparatus in which the demagnetizing is produced by passing an alternating current through the core windings and then attenuating the current by means of a potentiometer connected across the alternating current supply.

Fig. 3 illustrates another form of the invention. In this embodiment the record track 31 moving in the forward direction indicated by the arrow 31—F has a plurality of alternate paths indicated by the dash-double-dot line 31—S, the dash-triple-dot line 31—T and the dash-quadruple-dot line 31—P along which it may be impelled to move along the guide rollers 28, 28, a capstan roller 240 and erasing, recording and playback magnetic cores 37, 238 and 239 respectively.

Along the path 31—S, the record track is shown as moving at some distance from and out of magnetic linkage with the cores. A deflecting guide 48 which may be a fixed surface or a roller mounted on a deflecting arm 256 pivotally held as at 260 and having a cam follower portion or toe 264 mounted for operation by a cam 280, to change the guide path betweeen the guides 26 so that the record track is urged into magnetic linkage with the cores 37 and 235 as indicated by 31—T. Another deflecting guide 49 is also shown on an arm 257 having a toe 265 for operation by a cam 281 to change the record track guide path between the intermediate guide 26 and the capstan roller 240 so that the record track is magnetically linked with the magnetic playback core 239 as indicated by 31—P.

As indicated in the figure, the two cams 280, 281 may be arranged for simultaneous actuation as by the rotation of a selector knob 290 held on the cam shaft 204, and have projecting cam lobes 282, 283, 284 for engaging the toes 264, 265 and moving the arms against the action of biasing means, such as the springs 278.

The magnetic cores are shown as having their windings connected to the various transducing elements, amplifiers, oscillator, etc., by means of the switch 220 and the switch assembly 221 under the control of another cam 286 provided with cam lobes 287, 288 and 289 and connected for actuation together with cams 280 and 281.

The selector knob 290 is shown as rotatable into different control positions for rewinding, playback, fast forward reeling, recording or monitoring as indicated by the legends. The knob may be held in place by the latch gear 205 held on the cam shaft 204 and having teeth 207 engaged by a latch member, such as the pivoted latch lever 210 biased as by spring 212 toward a latching position defined by a stop 211. The cam shaft assembly may be biased as by the spring 217 to urge the selector in a counter-clockwise direction toward the rewind position. The nose 215 of the cam, however, is so shaped with respect to the teeth 207 as to resist such counter-clockwise rotation while permitting clockwise rotation of the teeth by manual operation of the selector knob 290, for example. Manual rotation of the selector knob in a counter-clockwise direction may be provided as by mounting the gear 205 and knob 290 so that they are slidable along their axis of rotation, and the knob may be axially moved to bring the cam 205 away from the plane of and out of engagement with the latch lever. Other techniques for permitting manual counter-clockwise control include the provision of conventional clutch means between the selector knob and the gear 205 so arranged that whenever rotatory power is transmitted from the selector knob to the gear the knob first moves through a lost motion range during which the clutch automatically moves the gear axially away from the plane of the latch or vice versa. As another alternative, the teeth 207 and latch nose 215 may be so shaped that the manual operation of the knob 290 can force the latch nose out against the latch bias to permit gear rotation, whereas the urging of the shaft bias 217 is insufficient for overriding the latching action.

The number of teeth 207 on the gear 205 need not be larger than one less than the number of control positions, as shown, a fixed stop 208 being suitable for defining the limiting positions.

The latch 210 is shown as connected by link 218 to a forward reeling limit lever 225 arranged for actuation when the unreeling of the record track from the supply reel is nearly completed.

As illustrated, the supply reel 20 is supported by a collar or table 226 and is provided with one or more slots 19, located adjacent the floor 18 of the record track receiving space 17 as well as drive connections, such as perforations, for receiving the top of the drive shaft 15 and a drive pin 228 extending up from the collar 226. Pivotally supported on the collar is shown a sensing member 230 having at its inner portion a sensing finger 232 positioned under an aperture 234 in the collar and biased upwardly, as by the distribution of its own mass, toward the reel 20. The reel slots 19 may be so related to the drive pin engagement that the mounting of a reel automatically positions a slot 19 over the sensing finger 232.

The outer end of the sensing member 230 is shown as provided with a depending lip 236, which when lowered by the upward movement of the sensing finger, will rotate with the collar 226 in a generally horizontal plane to strike the nearer end 242 of the limit member 225 which may in turn be pivoted as at 244 and biased toward a stop 246. When a portion of the inner turns of record track on the reel 20 obstruct the upward movement of sensing finger 232, the lip 236 is retracted above and out of reach of the limit member 225. The sensing finger may be positioned to move upwardly to cause tripping of the limit lever and cessation of unreeling with one or more anchoring turns of record track on the reel 20 so that a rewinding operation may be immediately started without the necessity of securing the record track end back on the supply reel 20.

The lip 236 and/or the limit member 225 may be provided with tapered surfaces for permitting their engagement during rewinding to lift the lip over the limit member end 242. As shown, this may be accomplished by shaping the lip with a sloping face 246 on the edge which advances during rewinding, the other edge which advances during forward reeling having a vertical face 250.

The limit lever 225 and the latch 210 are so interlinked that tripping of the lever 225 by the lip 236 disengages the nose 215 of latch 210 from the teeth 207 of gear 205 permitting the bias 217 to return the shaft 204 with all its cams to the limiting counterclockwise or rewind position as defined by a suitable stop, such as stop 208.

Another cam 245 containing lobes 246 and 247 is also shown as provided on the shaft 204 to control the operation of the capstan roller 240. In the form illustrated, the capstan roller is revolvably mounted as by the bearing 419 on a longitudinally slidable shaft 421. A flywheel 430 is also revolvably mounted as by bearing 431 held on a support 433 so that its control portions are adjacent the surface of the capstan roller.

The lower end of shaft 421 is illustrated as coacting with a slide 435 having a notch 438 so positioned that the lower end of shaft 421, which is downwardly biased, either drops into the notch or is cammed upwardly by the tapered side walls of the notch. The flywheel 430 may be impelled as by the motor 317 driving the roller 439 in frictional engagement with the periphery of the flywheel. The relatively large mass of the flywheel imparts a high inertia to the rotation and any vibrations originating in the power source may be eliminated by establishing a resilient frictional driving connection between the roller 439 and flywheel 430 as by providing either with a rubber-tired drive surface.

The slide 435 is shown as linked to a cam follower 441 having a toe 443 urged as by bias 442 into engagement with the cam 245. Under the actuation of this cam the slide 435 may be moved to permit the end of shaft 421 to drop into the notch 438 and lower the capstan roller 240. The adjacent surfaces of the capstan roller and the flywheel are so spaced that the dropping of the shaft 421 into the notch 438 brings the capstan roller into frictional driving engagement with the flywheel. If desired, this driving engagement may be made by means of a friction disc, such as a felt pad 445, positioned intermediate the engaging surface.

When frictionally engaged the capstan roller is driven at the desired record track impelling speed. The lifting of the shaft 421, as by engagement of the toe 443 with a low region of the cam 245, lifts the capstan roller out of engagement with the massive flywheel to permit movement of the record track along its guide path without the burden of the high inertia, as for example, when a high speed reeling is to be effected. The capstan motor is arranged to be energized as required to impel the record track during a transducing operation. An additional cam or circuit connection may be provided for closing the energizing circuit to this motor at the proper positions of the control elements.

As diagrammatically illustrated, another cam member 301 on the cam shaft 204 has two cam lobes 303, 305 arranged for operating switches 308 and 310 connected to establish power circuits to the reeling motors 315 and 316, respectively. These motors may be directly connected to the shafts 15 and 16 on which the supply and take-up reels are respectively mounted, as indicated. Power to these motors may be supplied by the ordinary electric power lines, through the plug-in connector 320, On-Off switch 322 and switch 323.

The B+ D. C. power supply circuit to the oscillator 76 as well as the amplifiers may also be arranged for control by switch 323, as indicated by connectors 411, and the rectifier 412 fed from the output of the switch.

The switch 323 is also shown as coacting with the control assembly 324 illustrated as including a pair of push rods 326, 328 labeled Start and Stop, respectively, slidably held in a frame 330 and interlinked by a latch plate 332 laterally slidable with respect to the push rods and biased as by spring 334 to engage cam projections 336 on these rods. Both rods are biased outwardly as by springs 338 and the switch 323 is biased to open position and arranged to be closed by inward actuation of the Start push rod 326 to establish the motor circuits to the switches 308 and 310.

Inward actuation of either push rod causes its cam projection 336 to engage an adjacent edge 337 of the latch plate and move the plate to the right against its bias. When the inward actuation has proceeded far enough to move the cam projection beyond the latch plate, the plate is automatically retracted to hold the push rod and keep it from moving out under the influence of the rod bias 338. Inward movement of either rod moves the latch plate to the right and unlatches an inwardly held rod.

To start a reeling operation, the Start push rod is actuated after the selector knob is positioned in the desired setting. This causes the actuation of either the supply reel motor 315 for rewinding or the take-up reel motor for forward reeling. Inward actuation of the Stop push rod 328 unlatches the Start push rod and permits switch 323 to open and stop the reeling.

In the construction illustrated, the take-up reel 21 is also provided with a reeling limit control for terminating a reeling operation when the record track is completely unreeled from the reel. As shown, this reel may be mounted in a manner similar to that shown for the supply reel 20 and the limit control may be of a generally similar nature. For reasons more fully set forth below the take-up reel limit control is shown as including a sensing finger 342 which projects from the take-up reel collar 227 and enters the inner regions of a slot 19 and engages the innermost turn of record track through a passageway 344 in the floor 18 of the record track reeiving space 17.

The sensing finger 342 is shown as held on a sensing member 346 slidably positioned on the collar as by means of a lug 350 and a passageway 352 in the collar. The sensing member 346 may be outwardly biased as by spring 353 or the centrifugal force developed during rotation which for rewinding may be of a relatively high speed.

In the general plane of the outer end 355 of the sensing member 346 is mounted the end 356 of a limit member 354 in such position as not to obstruct the end 355 as the slide 346 in the inward position in which it is held by the engagement of the finger 342 and the inner turn of record track rotates with the collar 227.

The limit member is shown as connected by link 360 with an unlatching lever 362 pivotally mounted to engage the latch plate 337 as by means of the pin 364. When during a reeling the Start push rod is in its inward position and the limit member 354 is tripped by the end 355 of the sensing slide 346, the latch plate is automatically moved to the right to permit the push rod bias to retract the Start rod and allow the switch 323 to open to stop the reeling.

According to the invention, means is provided to automatically demagnetize the magnetc cores when the rewind limit control is actuated. One form of such arrangement is shown in the figure as including a switch assembly 400 containing a group of switches 404, 406 and 408 automatically actuated by the unlatching lever 360 when the rewind limit member 354 is tripped.

Switches 404, 406 and 408 are shown in this construction as connecting the windings of the different cores with the high frequency output of the oscillator 76. The demagnetizing arrangement is so constructed as to impart decay characteristics to the output and improve its demagnetizing properties. In the form shown, the assembly 400 is so disposed that actuation of the lever 360 first closes the switches 404, 406 and 408 and then, after a lag which may be only momentary, unlatches the Start rod 326 and opens the switch 323. The closing of switches 404, 406 and 408 supplies alternating currents of large peak magnitudes to the core windings to insure substantial saturation of the cores. The opening of switch 323 interrupts the B+ power supply and the inherent capactance on the oscillator side of the switch 323 then discharges its stored energy so that the oscillator output dies out more gradually. An additional capacitor 420 may be shunted across the D. C. power line, as shown, to improve the decay characteristics if desired.

With the above apparatus, the necessary minimum of about three decaying cycles of demagnetizing alternations is readily obtained and effective core demagnetizations result.

Attention is called to the fact that the apparatus of the invention produces frequent core demagnetizations at a time when they do the most good, that is, just prior to the commencement of a transducing operation. All transducing operations are accordingly performed at a uniform high fidelity and with very little interference from noise even though one or more of these transducings has been preceded by a series of successive non-transducing reeling operations. In the past such a series of reeling operations by themselves would in many cases build up the background noise level to such an extent as to require a special demagnetizing operation. This difficulty is exceptionally serious when the magnetic cores are used with record tracks of the kind in which the magnetic medium is a stratum of finely divided permanently magnetizable material, such as described in the Kornei applications, Serial Nos. 685,092 and 685,093, filed July 20, 1946, the latter application having been abandoned.

It is believed that the large number of non-magnetic gaps present between the particles of such magnetic strata provide a great many magnetic poles highly sensitive to extremely slight magnetic variations at the cores. The overall magnetic response of an elemental length of such a record track bridging the non-magnetic gap of a magnetic core is the statistical average of the magnetic condition of the individual poles lying the bridging length and is easily changed by a variation in the magnetic condition of only a small portion of the poles. With magnetic record tracks, such as steel wire or tape having an unbroken magnetic medium, the difficulties though not as frequent are still objectionable. In any case, the apparatus of the invention is quite immune to the almost unpredictable disturbances previously experienced with transducers and particularly frequent when used with record tracks in which the magnetizable medium is finely divided. The most usually noticed prior art disturbance is the increase in background noise level to a point which in severe cases almost completely masks the signal. In some instances the magnetic cores had to be removed from the transducer and demagnetized by being placed in and taken out of a magnetic field.

According to the invention, no special manual operation is needed to prevent the prior art disturbances and an unskilled layman can operate a home type recorder with very high quality results. The amount and cost of materials necessary to provide the automatic demagnetization is quite small as can be seen from the above exemplifications.

The invention is applicable to transducers using either A. C. or D. C. bias and used with record tracks of any form, such as tapes or wire-like filaments. The other features of the transducers shown are not a part of the present invention and any reeling and/or control arrangements may be used. For example, where high frequency currents, such as those provided by the conventional oscillator, are not used for demagnetizing the cores, the erasing core may desirably be of the type using ordinary power frequencies fed through its windings, so that the oscillator may be simplified to produce only small bias currents and not the large currents necessary for erasing or demagnetizing. Erasing cores using power line frequencies are disclosed and claimed in the copending Begun application, Serial No. 723,374, filed January 21, 1947.

Additionally, the neutralizing means for feeding demagnetizing current to the cores, as shown in Fig. 3, need not be actuated by limit reeling controls coacting with the reels but may be arranged for operation by limit controls mounted in the record track guide path, as shown for example in the copending Begun application, Serial No. 723,735, filed January 23, 1947, or in the copending Dank application, Serial No. 690,878, filed August 16, 1946. Also the limit control or demagnetizing feed control may be actuated by special physical properties of the record track itself, there being provided in the guide path a special control which is sensitive to the special properties. For example, an electrically conductive strip may be secured near the end of an electrically non-conducting record track and a pair of contacts may be so disposed as to close a circuit when the record track moving in its guide path brings the conductive strip across them. This as well as other arrangements are also described in the above-mentioned Dank application.

According to another modification of the invention, a magnetic transducing apparatus may be arranged for operation by controls more suitable for actuation from a distance. This feature may be provided by a stepping magnet or solenoid such as those used to rotate a shaft in sequential small steps in a manner conventionally used for stepping switches. A construction embodying this feature may be in general similar to that of Fig. 3 modified by permitting the cam shaft 204 or its various cams to rotate completely around the shaft axis. The latch gear 205 together with the latch 210, stop 208 and bias 212 may be omitted and the stepping solenoid linked to the cams so that with each actuation of the solenoid windings the cams on the cam shaft are turned through an arc that brings them to the next operating position.

The operating positions may be distributed in uniformly spaced relation around the 360 degrees of cam rotation in an endless sequence each cycle of which may have the following steps in order

| | |
|---|---|
| Fast forward | Rewind |
| Playback | Stop |
| Record | |

so that by merely closing the solenoid circuit as from a long two wire control cable having one end connected to a power supply as well as to the solenoid windings and the other end provided with a switch, and desired transducing operation may be effected. Repeated actuation of the solenoid will rotate the cams so that they successively establish the operations of the sequence from Fast forward to Stop, after which the next relay actuation again establishes Fast forward operation.

With such a construction the monitoring operation is not required and only two magnetic cores are needed. The reeling limit control members may be arranged to also close the stepping circuit and automatically advance the cams to the next operating position of the endless sequence. For example when the reeling of a recording operation is completed, the forward reeling limit member will close a switch sending a power pulse through the solenoid windings and placing the apparatus in rewinding condition and beginning the rewinding. Near the end of the rewinding, the rewind limit member will repeat the power pulse thereby stopping the reeling. The rewind step may be arranged to become effective before the record track is completely removed from the take-up reel 21 so that further sequential transducing may be performed by remote control without rethreading the record track.

In the control sequence described above, at the end of a playback operation the apparatus will automatically be placed in condition for recording even though the forward reeling is completed. The forward limit control member such as lever 225 may be arranged so that the repeated engagement by the sensing lever 230 when moved into the engaging position causes the lever 225 to send repeated pulses through the windings of the stepping relay each pulse thereby steps the cams to the next position. As so arranged, the first turn of the supply reel at the end of a playback will automatically set the apparatus for recording. Since the recording involves additional forward reeling, the supply reel will make another revolution and the forward limit control will be again operated to send a second pulse through the relay to automatically advance the cams another step to the rewind position. The initiation of rewinding may then be arranged to promptly stop the forward reeling to prevent the supply reel from making a third complete revolution in the forward direction so that the rewinding will automatically continue without a further step of the cams which third step would cause stopping.

The control cable may be provided with an indicator mechanism to show the operating position of the apparatus to the control operator. The indicator mechanism may include a second stepping solenoid in the remote control end of the control cables operated in parallel with the cam stepping solenoid and arranged to rotate an indicator card so as to expose the proper card portion bearing a suitable legend through a viewing aperture. Alternatively a flexible shaft connected to the cam shaft 204 may be arranged to directly rotate the indicator card.

The Start-stop switch assembly 324 is not needed in the stepping modification and may be eliminated to simplify the controls. The demagnetizing switch mechanism 400 may be directly operated by the rewind limit control but one of the switches of this group may be omitted if only two magnetic cores are used, as indicated above.

The remainder of the sequentially-controllable apparatus may be quite similar to that shown in Fig. 3 including capstan control cam 245, motor control cam 301, record track guiding cam 280 and transducing control cam 286. The cam lobes, of course, will have to be redistributed to fit the step positions. Furthermore the amplifying and transducing circuits and switches may be modified for use with only two magnetic cores in the manner indicated in Fig. 1 for example, provision being made if desired to open the transducing circuits during operations not involving transducing, as when the record track is being rewound.

Of course stepping sequences other than that described above may be used within the scope of the invention. Some or all of the steps may be inverted in order. The fast forward step may follow the playback or the record step and the playback step may follow the record step. Furthermore a monitoring step may be inserted together with the monitoring features of the construction of Fig. 3. Additional Stop steps may be inserted where desired, after the fast forward step for example.

In those constructions in which the core neutralizing currents are fed to the cores under the control of a sensing member responsive to the presence of record track in the guide path between the record track holding reels, suitable arrangement may be provided to render the demagnetizing means inoperative at all times except when a rewinding operation is completed. For example, an interlocking control, such as a switch, may be arranged to be operated by the setting of the apparatus controls into a rewinding position and only operate the demagnetizing means when the interlock switch is closed and the sensing member calls for core demagnetizing as by indicating the absence of record track in the rewind guide path.

In the forms of the invention described above in connection with Fig. 3, all the record track guide paths may be in magnetic contact with one or more of the cores and may even be identical. For example the pole faces of the cores may be burnished so as to minimize friction against the moving record track and the non-transducing reeling operations such as rewinding and fast forward reeling may be arranged to take place with the record track contacting these cores and preferably with the pressing parts restricted so as not to hold the record track firmly against the cores. As so arranged the demagnetizing of the cores under the predetermined conditions described in connection with Fig. 3 is just as highly effective.

Additionally the capstan drives shown in connection with Figs. 1 and 3 may be modified without affecting the basic principles of the invention. For example the capstan may be arranged to be automatically or manually disconnected from the record track during non-transducing reeling operations, as shown in the above-mentioned Dank and Begun applications.

In this application by a recitation of a transducing operation is intended a recording operation or a playback operation or an erasing operation or any combination of two or more of such operations.

The principles of the invention explained in connection with specific exemplifications thereof will suggest to those skilled in the art many other applications and modifications of the same. It is accordingly desired that the appended claims be construed broadly, and that they shall not be limited to the specific details shown and described in connection with exemplifications thereof.

I claim:

1. In a magnetic record transducing apparatus for magnetically recording signals of the audio frequency range with a superposed alternating bias field of at least twice higher frequency on a magnetizable recording medium moving past transducer head means along a transducing path and for reproducing recorded signals therefrom; a recording medium comprising an elongated flexible record track having a bonded stratum of permanently magnetizable powder particles; transducer head means including at least one set of transducer windings and a loop-like magnetic core structure extending essentially along one side of the adjacent moving record track and magnetically interlinked with said windings and with successive elements of the moving record track; guide means including control means selectively actuable to cause said apparatus to carry on either a recording operation or a reproducing operation; said control means also including setting means having setting elements selectively settable to either one of a plurality of settings including a recording setting or a reproducing setting whereby said control means is selectively set to cause said apparatus to perform either a recording operation or a reproducing operation; means including said transducer head means and said recording medium whereby said apparatus will record signals with a superposed bias field current which is substantially below a level sufficient to saturate said core structure; and normally ineffective neutralizing means having a supply circuit including at least some windings interlinked with said core structure and actuable to magnetize said core structure with at least three current waves of alternating current, starting with a wave portion of relatively high intensity sufficient to saturate said core structure, and ending with a wave portion of low intensity effective in reducing the magnetization of said core structure to substantially zero; said control means including activating means whereby said control means will start a reproducing operation in response to the actuation of said setting means and actuate said neutralizing means to supply said current waves to said windings of said core structure and effect substantial neutralization of said core structure.

2. In a magnetic record transducing apparatus as claimed in claim 1, said control means also including means for delaying movement of said track along said transducing path past said head means until substantial completion of said neutralization.

3. In a magnetic record transducing apparatus as claimed in claim 1, said activating means being also operative in response to actuation of said setting means to start a recording operation for actuation of said neutralizing means and effect said neutralization of said core structure.

4. In a magnetic record transducing apparatus as claimed in claim 3, said control means also including means for delaying movement of said track along said transducing path past said head means until substantial completion of said neutralization.

5. In a magnetic record transducing apparatus as claimed in claim 1, the setting means of said control means being also selectively settable to a stop setting, whereby said control means may be selectively set to stop said operations, said activating means being also operative in response to actuattion of said setting means either to start a recording operation or to stop said operations for actuation of said activating means and effect said neutralization of said core structure.

6. In a magnetic record transducing apparatus as claimed in claim 5, said control means also including means for delaying movement of said track along said transducing path past said head means until substantial completion of said neutralization.

7. In a magnetic record transducing apparatus as claimed in claim 1, further characterized by means to impel said track at a desired transducing speed during said transducing operations, and by means to impel said track at a higher non-transducing speed along a non-transducing path in which all elements of the moving track are maintained spaced away from said head means to remain at all times out of magnetic linkage with said core structure, the setting means of said control means being also selectively settable either to a non-transducing setting, or a stop setting, whereby said control means may also be selectively set to cause said apparatus to perform either a non-transducing operation, or to stop said operations, said activating means being also operative in response to actuation of said setting means to start either a recording operation or a non-transducing operation, or to stop said operations, for actuation of said activating means and to effect said neutralization of said core structure.

8. In a magnetic record transducing apparatus as claimed in claim 7, said control means also including means for delaying movement of said track along said transducing path past said head means until substantial completion of said neutralization.

9. In a magnetic record transducing apparatus as claimed in claim 1, further characterized by means to impel said track at a desired transducing speed during said transducing operations, and by means to impel said track at a higher non-transducing speed along a non-transducing path in which all elements of the moving track are maintained spaced away from said head means to remain at all times out of magnetic linkage with said core structure, the setting means of said control means being also selectively settable either to a non-transducing setting, or a stop setting, whereby said control means may also be selectively set to cause said apparatus to perform either a non-transducing operation, or to stop said operations, said activating means being also operative in response to actuation of said setting means to start either a recording operation or to stop said operations, for actuation of said activating means and effect said neutralization of said core structure, and means preventing activation of said neutralizing means when said setting means is set to a non-transducing setting and performing a non-transducing operation.

10. In a magnetic record transducing apparatus as claimed in claim 9, said control means also including means for delaying movement of said track along said transducing path past said head means until substantial completion of said neutralization.

11. In a magnetic record transducing apparatus as claimed in claim 1, further characterized by means to impel said track at a desired transducing speed during said transducing operations, and by means to impel said track at a higher non-transducing speed along a non-transducing path in which all elements of the moving track are maintained spaced away from said head means to remain at all times out of magnetic linkage with said core structure; the setting means of said control means being also selectively settable to a non-transducing setting, whereby said control means may be selectively set to cause said apparatus to perform a non-transducing operation; said apparatus including a pair of reels on which the major part of the track is held in coiled form with an intermediate portion of the track extending between the reels for movement in forward direction along said transducing path when the track is reeled from the storing reel onto the take-up reel during a transducing operation; said control means also including limit means actuated upon termination of a forward reeling operation to rewind said track along said non-transducing path onto the said storing reel; and limit means operative in response to termination of a rewinding operation for actuating said neutralizing means to effect said neutralization of said core structure.

12. In a magnetic record transducing apparatus as claimed in claim 1, further characterized by means to impel said track at a desired transducing speed during said transducing operations, and by means to impel said track at a higher non-transducing speed along a non-transducing path in which all elements of the moving track are maintained spaced away from said head means to remain at all times out of magnetic linkage with said core structure; the setting means of said control means being also selectively settable either to a non-transducing setting, or a stop setting, whereby said control means may also be selectively set to cause said apparatus to perform either a non-transducing operation, or to stop said operations; said activating means being also operative in response to actuation of said setting means to start either a recording operation or to stop said operations for actuation of said activating means and effect said neutralization of said core structure; said apparatus including a pair of reels on which the major part of the track is held in coiled form with an intermediate portion of the track extending between the reels for movement in forward direction along said transducing path when the track is reeled from the storing reel onto the take-up reel during a transducing operation; said control means also including limit means actuated upon termination of a forward reeling operation to rewind said track along said non-transducing path onto the said storing reel; and limit means operative in response to termination of a rewinding operation for actuating said neutralizing means to effect said neutralization of said core structure.

13. In a magnetic record transducing apparatus as claimed in claim 12, and means preventing activation of said neutralizing means when said control means is actuated to a non-transducing setting.

SEMI JOSEPH BEGUN.

REFERENCES CITED

The following references are of record in the file of this patent:

UNITED STATES PATENTS

| Number | Name | Date |
|---|---|---|
| 1,588,706 | Cothran | June 15, 1926 |
| 1,886,856 | Warwick | Nov. 8, 1932 |
| 2,069,841 | Massonneau | Feb. 9, 1937 |
| 2,235,132 | Woolridge | Mar. 18, 1941 |
| 2,336,886 | Peterson | Dec. 14, 1943 |
| 2,351,004 | Camras | June 13, 1944 |
| 2,351,010 | Camras | June 13, 1944 |
| 2,361,752 | Eilenberger | Oct. 31, 1944 |

FOREIGN PATENTS

| Number | Country | Date |
|---|---|---|
| 97,306 | Sweden | Nov. 7, 1939 |
| 693,664 | Germany | June 20, 1940 |